2,961,468

PRODUCTION OF BENZYLACETOPHENONES

Friedrich Becke, Heidelberg, and Herbert Bittermann, Ludwigshafen (Rhine), Germany, assignors to Badische Anilin- & Soda-Fabrik Aktiengesellschaft, Ludwigshafen (Rhine), Germany No Drawing. Filed May 16, 1958, Ser. No. 735,705

Claims priority, application Germany May 28, 1957

2 Claims. (Cl. 260—590)

The present invention relates to a new and simplified process for the production of benzylacetophenone and benzylacetophones which are substituted in the nucleus, especially in one or both aromatic rings of the benzylacetophenone, by alkyl groups of low molecular weight, alkyl ether groups or halogenalkyl groups with lower alkyl groups or halogen atoms.

Various methods are already known for the production of benzylacetophenone and its derivatives. One of the most common and, hitherto, one of the simplest methods for example comprises reacting acetophenone with benzaldehyde in the presence of alcoholates or other basic condensing agents and catalytically hydrogenating the resultant benzalacetophenone (chalcone). Derivatives of benzylacetophenone may be obtained in an analogous way by starting from nuclear-substituted initial materials. This method has the disadvantage that it requires several process stages and/or starts from compounds which are not readily accessible.

We have now found that benzylacetophones of the general formula:

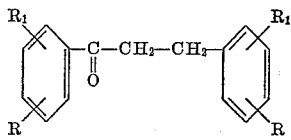

wherein R and $R_1$ represent hydrogen, halogen atoms or alkyl, halogenalkyl or alkoxy groups with 1 to 12 carbon atoms in the alkyl radicals, can be obtained in a simple, way and in good yields by allowing an acrylic acid halide to act on benzene and/or a benzene derivative of the general formula:

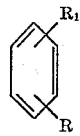

in which R and $R_1$ have the above significance, in the presence of a catalyst of the Friedel-Crafts group.

Alkyl benzenes, halogen benzenes, halogenalkyl benzenes and phenol ethers for example are suitable as benzene derivatives provided they contain 1 to 12 carbon atoms in the alkyl radical.

It is true that it is known to react acid chlorides of saturated carboxylic acids with aromatic hydrocarbons according to Friedel-Crafts to form ketones; olefines or chlorhydrocarbons have also already been condensed with benzene or other aromatics while using aluminium chloride, sulfuric acid or other catalytically acting substances. It is surprising, however, that readily polymerizable acrylic acid halides will react in a smooth reaction with aromatic hydrocarbons, such as benzene, in the presence of Friedel-Crafts catalysts to form benzylacetophenones. It would have been expected that an acrylic acid halide polymerizes under the reaction conditions used or that the condensation, if the acrylic acid halide did not polymerize in the presence of these catalysts, would lead to the formation of indanones or the condensation of a benzene ring would take place at the carbon atom adjacent to the acid halide group.

For example the reaction according to the invention may be represented, when using benzene and acrylic acid chloride, by the following equation:

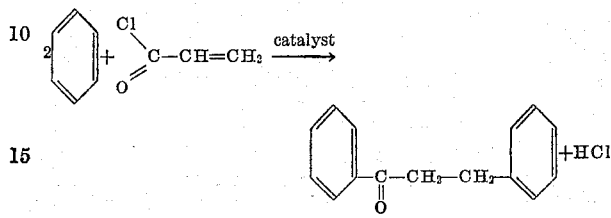

Besides benzene as already described, there are also suitable, as initial materials, mono- and di-alkylbenzenes with alkyl groups having 1 to 12 carbon atoms, as for example toluene, xylene, ethylbenzene, isopropylbenzene, diisopropylbenzene, pentylbenzene, octylbenzene, dioctylbenzene and dodecylbenzene, and also halogenbenzenes, such as chlorbenzene, brombenzene, dichlorbenzenes, halogenalkylbenzenes, for example chlortoluenes, chlorethylbenzene, chlor- or brom-octylbenzene or chlor- or brom-dodecylbenzene, and also phenol ethers, such as anisol, phenetol, veratrol and phenyl-butyl-, phenyl-octyl- and phenyl-dodecyl ethers.

Of the acrylic acid halides, the chloride is especially suitable, but the same good results are also achieved with other acid halides, for example with acrylic acid bromide.

The reaction, which proceeds exothermically, may be carried out at room temperature or at elevated temperature, if necessary while withdrawing the heat formed. The most favorable temperatures lie in the range between room temperature and about 200° C. Especially preferred are temperatures of about 20° to 100° C., in particular between about 40° and 80° C. The process may be carried out at atmospheric or slightly increased pressure, for example 20 atmospheres, or at reduced pressure. It is possible to work continuously or in batch operation.

The aromatic components for example benzene are used for the reaction at least in the amount theoretically necessary and advantageously in excess, for example twice to four times, preferably about four times, in excess of the calculated molar amount. By using an excess of the aromatic component, the intermolecular reaction is favored at the expense of the intramolecular reaction and it is not necessary to add a diluent. Inert diluents, as for example carbon disulfide, may however be used in principle.

For the production of benzylacetophenones having various substituents in the aromatic rings, it is preferable to allow one aromatic initial component to react with the corresponding molar amount of an acrylic acid halide, for example at temperatures of about 0° to about 20° C., to introduce another aromatic reaction component in more than the molar amount of the acrylic acid halide used, for example 2 to 8 times the molar amount, and to continue the reaction at room temperature or advantageously at higher temperature, for example 40° to 80° C.

Aluminium chloride is suitable with special advantage as the condensing agent. Other catalysts of the Friedel-Crafts group are however also applicable, for example zinc chloride, boron fluoride, hydrogen fluoride, and also sulfuric acid, phosphoric acid or phosphorus oxychloride. In general the catalyst is used in about the molar amount corresponding to the acrylic acid halide. It is however advantageous to use somewhat more, for example an excess of up to about 20%. This excess of about 20% corresponds to 1.2 mols of the catalysts per mol of acrylic acid halide. An acceleration of the reaction can be achieved by irradiation of the reaction solution with ultraviolet light of about 248 to 436 millimicrons.

The process may suitably be carried out by introducing the acrylic acid halide into the aromatic benzene hydrocarbon or its substituted derivatives containing the catalyst. The acrylic acid halide may be introduced for example as a solution or suspension such as is obtained directly by the production of the acrylic acid halide by reaction of acrylic acid or its salts, especially the alkali or alkaline earth metal salts or ammonium acrylate, with phosphorus halides, as for example phosphorus pentachloride, phosphorus pentabromide, phosphorus trichloride, phosphorus tribromide, or phosphorus oxyhalides, as for example phosphorus oxychloride, in a suitable inert anhydrous organic solvent, as for example in petrol ether or an aromatic hydrocarbon, such as benzene or its alkyl-substituted homologues.

The benzylacetophenone or its nuclear-substituted derivatives (of which also those having different nuclear substituents can be prepared according to the invention) may be recovered in the usual way, for example after decomposition of the catalyst, by extraction or phase separation, as well as by washing the organic phase and subsequent distillation.

The benzylacetophenones obtained are suitable for use as softeners for polyvinyl chloride and as intermediate products. They are in part new compounds.

The following examples will further illustrate this invention but the invention is not restricted to these examples. The parts specified in the examples are parts by weight.

*Example 1*

136 parts of acrylic acid chloride are allowed to flow in the course of an hour into a mixture of 650 parts of anisol and 210 parts of aluminium chloride with powerful stirring and reflux cooling at about 55° to 70° C. After the cessation of the evolution of hydrogen chloride, it is further stirred at about 60° C. for another hour and the Bordeaux red solution poured onto ice. The yellow emulsion formed is extracted with either. The ethereal extracts are united and washed free from acid. After drying the solution, the ether and unreacted anisol are distilled off. The residue is fractionally distilled under reduced pressure. After a small first runnings, 332 parts of 1.3-bis-anisyl-propanone-(1) of the boiling point 236° C. at 5 Torr are obtained. The yield amounts to 82% of the theoretical yield, with reference to acrylic acid chloride introduced.

By using benzene or anisol instead of ether for the extraction of the said emulsion, the same yield of 1.3-bis-anisyl-propanone-(1) is obtained following working up.

*Example 2*

A solution of acrylic acid chloride which has been prepared by reaction of 172 parts of acrylic acid with 500 parts of phosphorus pentachloride in about 300 parts of petrol ether (boiling point 45° to 65° C.) while cooling externally with a mixture of ice and common salt, is added continuously to 1000 parts of anisol and 340 parts of aluminium chloride while stirring at 45° to 60° C. The addition of the acrylic acid chloride solution takes place at such a rate that the reaction temperature does not exceed 60° C. and the reaction does not proceed too violently. After the reaction has ended, the reaction mixture is further stirred for 90 minutes at the same temperature and then poured onto ice. The organic phase is separated from the aqueous phase and washed free from acid. The organic solution is dried and then fractionally distilled. After separating the unreacted anisol, reduced pressure is used. 488 parts of 1.3-bis-anisyl-propanone-(1) of the boiling point 185° to 212° C. at 0.5 Torr are obtained. The yield amounts to 77% of the theoretical yield, with reference to the acrylic acid used for the preparation of the acrylic acid chloride.

*Example 3*

178 parts of acrylic acid chloride are allowed to flow in the course of 2 hours into a suspension of 830 parts of commercial xylene (a mixture of isomers) and 295 parts of aluminium chloride at 50° to 60° C. while stirring under reflux. The whole is stirred for another 2 hours to complete the reaction and then the reaction mixture is poured onto a mixture of ice and hydrochloric acid. The aqueous phase is separated and twice extracted, each time with 200 parts of benzene. The extracts are united with the organic phase and the solution shaken up twice, each time with 300 parts of 2-normal aqueous hydrochloric acid and then washed with water until neutral. After distilling off the extraction agent and the unreacted xylene, there is obtained a yield of crude 1.3-bis-xylylpropanone-(1) of 450 parts. By fractional distillation there may be recovered therefrom 334 parts of pure 1.3-bis-xylyl-propanone-(1) of the boiling point 160° to 180° C. at 0.7 to 0.8 Torr. The yield amounts to 64% of the theoretical yield with reference to the acrylic acid chloride introduced.

*Example 4*

A solution of acrylic acid chloride, which has been obtained by reaction of 173 parts of acrylic acid with 500 parts of phosphorus pentachloride in 300 parts of dry benzene while stirring and cooling with ice and common salt, is added at 65° to 75° C. to 1000 parts of benzene to which 350 parts of aluminium chloride have been added. After the whole of the solution containing the acrylic acid chloride has been introduced, the reaction mixture is stirred for another 2 to 3 hours and then poured onto ice. The organic phase is washed free from acid. After distilling off the unreacted benzene there remain 270 parts which yield 230 parts of benzylacetophenone by further distillation. The yield amounts to 45% of the theoretical yield.

*Example 5*

150 parts of aluminium chloride are suspended in 400 to 500 parts of carbon disulfide and then while stirring and cooling to 0° to 20° C., 90 parts of acrylic acid chloride together with 108 parts of anisol are slowly introduced. The reaction mixture is irradiated with a mercury vapor lamp to accelerate the reaction. After the evolution of hydrogen chloride has subsided, 300 to 400 parts of benzene are added, the whole is heated to 60° to 70° C. and the alkylation thus completed in 2 to 3 hours. The product is poured onto ice and washed free from acid in the usual way. After distilling off the carbon disulfide and excess benzene, there are obtained by vacuum distillation 95 parts of 1-anisyl-3-phenyl-propanone-(1) of the boiling point 210° to 217° C. at 1.5 Torr. The yield amounts to 40% with reference to acrylic acid chloride.

*Example 6*

216 parts of acrylic acid chloride are allowed to flow slowly at 60° to 70° C. into 1080 parts of chlorbenzene and 350 parts of aluminium chloride in the course of 2 hours while stirring. The whole is further stirred for 2 hours and then decomposed with 2-normal aqueous hydrochloric acid containing pieces of ice. The organic phase is separated, washed until neutral, freed from excess chlorbenzene and distilled in vacuo. 330 parts of 1.3-bis-(chlorphenyl)-propanone-(1) are obtained at the boiling point 175° to 200° C. at 0.5 Torr. The yield amounts to 55% of the theoretical yield.

Example 7

150 parts of acrylic acid chloride are slowly introduced at 80° C. into a mixture of 1130 parts of meta-dichlorbenzene and 220 parts of aluminium chloride and the mixture further stirred for 3½ hours at 80° C. The reaction solution is poured into about 20% hydrochloric acid while stirring powerfully and cooling and then allowed to stand for some time. Of the layers which form, the upper non-aqueous layer is separated and washed neutral with soda solution. The solution obtained is dried with anhydrous sodium sulfate and the excess of meta-dichlorbenzene distilled off. The residue is distilled at a reduced pressure of 0.5 Torr. 200 parts of 1.3-bis-(meta-dichlorphenyl)-propanone-(1) of the boiling point 160° to 190° C. at 0.5 Torr are obtained.

Example 8

150 parts of acrylic acid chloride are introduced at 70° C. in the course of 2 hours while stirring into a mixture of 890 parts of meta-chlortoluene and 225 parts of aluminium chloride. The reaction mixture is stirred for another 2 hours at 80° C. and then poured onto ice. The organic phase is separated and washed with a saturated aqueous sodium chloride solution. The solution is dried with sodium sulfate and, after separation of the drying agent, freed from excess meta-chlortoluene by distillation. By vacuum distillation of the crude reaction product thus obtained, 238 parts of 1.3-bis-(meta-chlortoluyl)-propanone-(1) are obtained at the boiling point 137° to 160° C. at 0.5 to 1 Torr. The yield amounts to 47% of the theoretical yield.

Example 9

90 parts of acrylic acid chloride are introduced at 70° C. within 45 minutes into a mixture of 150 parts of aluminium chloride in 600 parts of phenetol. After the dripping-in has finished, the whole is stirred for another 2 hours at 70° C. and the aluminium compound is decomposed by pouring the reaction mixture onto a mixture of ice and hydrochloric acid. The mixture is allowed to stand for some time until two layers have formed and the upper layer is then separated. It is washed neutral with water and dried with calcium chloride. The drying agent is filtered off and the unreacted phenetol distilled off. By fractional distillation under reduced pressure there are obtained 233 parts of 1.3-bis-phenoxyethyl-propanone-(1) of the boiling point 208° C. at 0.5 Torr. The yield amounts to 75%, of the theoretical yield with reference to the acrylic acid chloride introduced.

Example 10

90 parts of acrylic acid chloride are introduced into a mixture of 500 parts of cumene and 170 parts of aluminium chloride at 70° C. while stirring in the course of 1 hour. After all has been introduced, stirring is continued for another 2 hours and the reaction mixture then poured into a mixture of ice and hydrochloric acid. The mixture is then allowed to stand, and two phases form. The aqueous phase is separated from the organic phase and the latter washed neutral with water. The washed solution is then dried and, after filtering off the drying agent, freed from unreacted cumene by distillation. The residue is distilled under a reduced pressure of 0.3 Torr. 88 parts of 1.3-bis-(isopropylphenyl)-propanone-(1) of the boiling point 150° to 160° C. at 0.3 Torr are obtained. The yield amounts to 30% with reference to the acrylic acid chloride introduced.

What we claim is:

1. A process for the production of benzylacetophenones of the general formula:

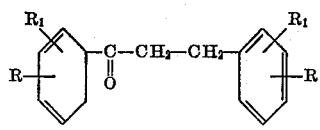

wherein R and $R_1$ each represents a member of the group consisting of a hydrogen atom, a bromine atom, a chlorine atom, and an alkyl and alkoxy group with 1 to 12 carbon atoms in the alkyl radical, which comprises reacting, in relative proportions, about 1 mol of an aromatic compound of the general formula

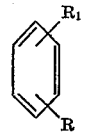

wherein R and $R_1$ are as above defined with 1 mol of acrylic acid chloride and 1 to 1.2 mols of aluminium chloride at 0° to 20° C. and then reacting this mixture with 2 to 8 mols of another benzene derivative of the general formula

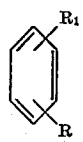

wherein R and $R_1$ are as above defined at temperatures of 40° to 80° C.

2. A process for the production of 1-anisyl-3-phenyl-propanone-(1) which comprises reacting, in relative proportions, 1 mol of acrylic acid chloride with about 1 mol of anisol and 1 to 1.2 mols of aluminium chloride in the presence of carbon disulfide at a temperature between 0° and 20° C. while cooling and irradiating with ultraviolet light, then when the evolution of hydrogen chloride has ceased, adding about 2 to 8 mols of benzene and heating the mixture at about 60° to 70° C.

References Cited in the file of this patent

Moureu: Bull. Soc. Chim. de France, vol. 9, pp. 568–76 (1893).

UNITED STATES PATENT OFFICE
CERTIFICATION OF CORRECTION

Patent No. 2,961,468                           November 22, 1960

Friedrich Becke et al.

It is hereby certified that error appears in the above numbered patent requiring correction and that the said Letters Patent should read as corrected below.

Column 3, line 45, for "either" read -- ether --.

Signed and sealed this 23rd day of May 1961.

(SEAL)
Attest:

ERNEST W. SWIDER                      DAVID L. LADD

Attesting Officer                        Commissioner of Patents